(No Model.)

G. A. KEENE.
HUB ATTACHING DEVICE.

No. 317,144. Patented May 5, 1885.

Witnesses
A. M. Tuttle
C. C. Tuttle

Inventor
Geo. A. Keene
By En. Tuttle
Attorney

UNITED STATES PATENT OFFICE.

GEORGE A. KEENE, OF LYNN, MASSACHUSETTS.

HUB-ATTACHING DEVICE.

SPECIFICATION forming part of Letters Patent No. 317,144, dated May 5, 1885.

Application filed December 29, 1884. (No model.)

*To all whom it may concern:*

Be it known that I, GEORGE A. KEENE, of Lynn, in the county of Essex and Commonwealth of Massachusetts, have invented a certain new and Improved Axle-Coupling, of which the following, taken in connection with the accompanying drawings, is a specification.

This invention relates to axle-couplings, and particularly to that class of axle-couplings wherein a ball is employed, in combination with a groove in the axle, for the purpose of retaining the wheel on the axle; and it is the object of this invention to effect a more simple and economical arrangement of the ball and groove relatively to the axle than any heretofore devised; and it also pertains to the means and the arrangement of the means employed to retain the ball within the groove.

The nature of the invention is more fully described hereinafter, and is specifically pointed out in the claims.

Figure 1:
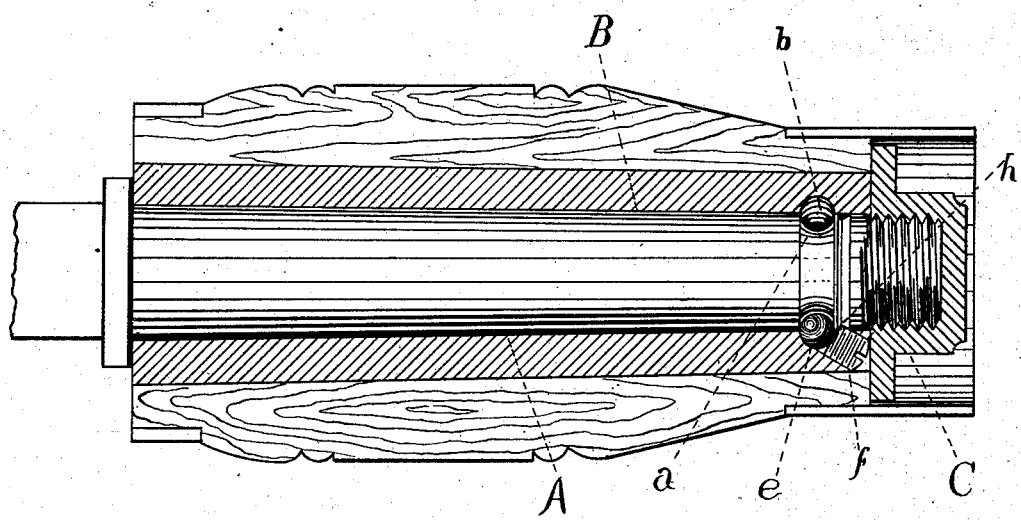
Figure 2:
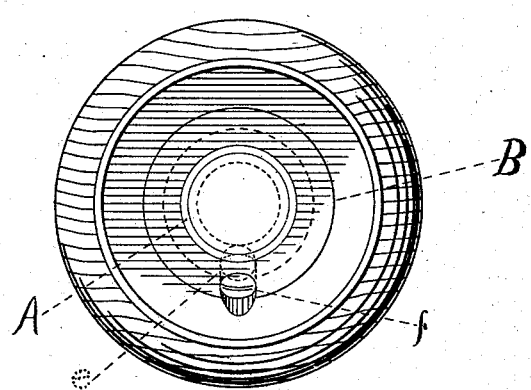

Referring to the drawings, Figure 1 is a longitudinal vertical section of the wheel hub and box, the axle, and my improved coupling device combined. Fig. 2 is an end view of the same parts combined, and with the nut C removed to better illustrate the arrangement of the screw which sustains the ball in place.

The axle A is constructed with a groove, $a$, which extends entirely round the axle, and is semicircular in cross-section, and in the bushing or box B of the hub is a corresponding groove, $b$. The two grooves, registering with each other as shown, form a circular groove for the reception of the coupling-balls $e$. Said balls are inserted into the groove through the opening filled by the screw $f$, and one half of the ball remains in the groove $a$, while the other half thereof plays in the corresponding groove $b$, thus preventing the wheel from coming off the axle. The ball having been inserted into the groove is retained therein by means of the screw $f$, and to this end the screw is made flat on its end face, and is screwed into the opening made therefor until the end of the screw bears or comes into sliding contact with the ball, which stands in the groove opposite the end of the screw, and thereupon the nut C is put onto the end of the axle, and, being screwed closely up against the outer end of screw $f$, prevents the same from working outward.

The opening for screw $f$, it will be observed, is made to enter the groove on an incline relatively to the axle, and this is done in order that the screw $f$ may not be parallel with the axle, but, on the contrary, that it may be inclined relatively thereto, in order that the backward action, if any, of the screw may not be in direct line with the action of the nut C, but inclined to the same, and thus tend to cramp and hold 'the nut in place. The corner $h$ of the screw enters slightly into the axle, as shown, and the axle is grooved in this line, to allow the screw to play round with the hub.

In operation I prefer to fill the groove with balls, though I am persuaded that good results may be obtained with a single ball, though the result is more satisfactory to me when a number of balls are used.

By allowing the rear end of the screw $f$ to rest against the nut C all wet or dampness, as well as dirt, is prevented from getting to the screw to rust and set the same.

In case of accident by reason of the balls failing to act, the nut C operates as a safety device to keep the wheel from sliding off. It also holds the oil up to and against the screw $f$, thus preventing the screw from rusting, and keeping it in condition to be easily turned out or in with an ordinary screw-driver.

I am aware that it is not new to provide an axle and its box with grooves and place within the said grooves anti-friction balls, as such an arrangement is old and well known, being shown in the patent of Chinnock, of January 9, 1849, and I do not therefore claim, broadly, such construction, my invention being limited to the particulars hereinafter pointed out in the claims.

Having thus described my invention, I claim as new and desire to secure by Letters Patent—

1. In combination with the axle A and hub or box B, grooved as described, the ball or balls $e$ and screw $f$, said screw being inclined relatively to the axle, and a suitable holding device on the axle to bear upon the rear end of the screw to retain the same in place, substantially as described.

2. In combination with the axle A and hub or box B, grooved as described, the ball or balls $e$ and screw $f$, said screw being inclined relatively to the axle, and the nut C on the axle adapted to bear against the rear end of the screw to retain the same in place, substantially as described.

GEO. A. KEENE.

Witnesses:
C. F. STACKPOLE,
C. C. TUTTLE.